United States Patent
Hsu

(10) Patent No.: US 9,453,164 B2
(45) Date of Patent: Sep. 27, 2016

(54) LIQUID CRYSTAL ALIGNMENT AGENT AND USES THEREOF

(71) Applicant: CHI MEI CORPORATION, Tainan (TW)

(72) Inventor: Li-Tao Hsu, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 0 days.

(21) Appl. No.: 14/711,107

(22) Filed: May 13, 2015

(65) Prior Publication Data

US 2015/0329779 A1 Nov. 19, 2015

(30) Foreign Application Priority Data

May 15, 2014 (TW) .............................. 103117220 A

(51) Int. Cl.
| | |
|---|---|
| *C08K 5/15* | (2006.01) |
| *C08K 3/34* | (2006.01) |
| *C09K 19/56* | (2006.01) |
| *C09K 19/52* | (2006.01) |
| *C08L 79/08* | (2006.01) |
| *C08K 5/1515* | (2006.01) |
| *C09D 179/08* | (2006.01) |
| *C08G 73/06* | (2006.01) |
| *C08G 73/10* | (2006.01) |

(52) U.S. Cl.
CPC ........... *C09K 19/56* (2013.01); *C08G 73/0627* (2013.01); *C08G 73/105* (2013.01); *C08G 73/1042* (2013.01); *C08G 73/1078* (2013.01); *C08G 73/1085* (2013.01); *C08K 5/1515* (2013.01); *C08L 79/08* (2013.01); *C09D 179/08* (2013.01); *C09K 19/52* (2013.01); *C09K 2019/525* (2013.01)

(58) Field of Classification Search
None
See application file for complete search history.

(56) References Cited

U.S. PATENT DOCUMENTS

2012/0172542 A1* 7/2012 Tsai .............................. 525/449

FOREIGN PATENT DOCUMENTS

| JP | P2009-175684 A | 8/2009 |
|---|---|---|
| TW | 200627009 | 8/2006 |

OTHER PUBLICATIONS

Office action issued on Mar. 27, 2015 for the corresponding Taiwan Patent Application No. 103117220 and its corresponding search report.
English translation of the search report issued on Mar. 27, 2015 for the corresponding Taiwan Patent Application No. 103117220.
English abstract translation for TW200627009.

* cited by examiner

*Primary Examiner* — Susannah Chung
*Assistant Examiner* — Robert T Butcher
(74) *Attorney, Agent, or Firm* — WPAT, P.C., Intellectual Property Attorneys; Anthony King

(57) ABSTRACT

The invention relates to a horizontal liquid crystal alignment agent which provides a polymer (A) and a solvent (B). The polymer (A) is obtained by reacting a mixture comprising a tetracarboxylic acid dianhydride component (a) and a diamine component (b). The invention also provides a liquid crystal alignment film made by the liquid crystal alignment agent as mentioned above and a liquid crystal display element having the liquid crystal alignment film. The liquid crystal alignment film has high rubbing resistance.

10 Claims, 1 Drawing Sheet

LIQUID CRYSTAL ALIGNMENT AGENT AND USES THEREOF

BACKGROUND OF THE INVENTION

1. Field of the Invention

The invention relates to a liquid crystal alignment agent and uses thereof. Particularly, the invention relates to a liquid crystal alignment agent for forming a liquid crystal alignment film having high rubbing resistance and a liquid crystal display element containing the liquid crystal alignment film.

2. Description of the Related Art

In recent years, the development of new liquid crystal display elements has become flourishing. For example, a new liquid crystal display element is developed, wherein liquid crystals are driven by two electrodes equipped with a pectinate way on one side substrate for producing a parallel electric field on a surface of the substrate for controlling the liquid crystals. The liquid crystal display element is known as In-Plane-Switching type (IPS type) and has excellent wide view angle property. However, the IPS type liquid crystal display element has the problem of image sticking due to high ion density.

Japanese Patent Publication No. 2009-175684 discloses a liquid crystal alignment film having low ion density and a diamine compound having piperazine for forming the liquid crystal alignment film. By using the diamine compound having piperazine, the alignment film formed therefrom can improve the problem of high ion density. However, in the follow-up process, when the alignment film is under rubbing treatment by cloth, it is easy to produce debris causing low display quality so it cannot be accepted in the field.

Therefore, in order to meet the requirements of IPS type liquid crystal display elements, a liquid crystal alignment agent for forming a liquid crystal alignment film having good rubbing resistance is a target remained to be achieved.

SUMMARY OF THE INVENTION

In the present invention, a specific polymer is provided to obtain a horizontal liquid crystal alignment agent. A liquid crystal alignment film and a liquid crystal display element formed by the liquid crystal alignment agent as mentioned above have high rubbing resistance.

Therefore, the present invention relates to a liquid crystal alignment agent comprising:
a polymer (A) obtained by reacting a mixture comprising a tetracarboxylic acid dianhydride component (a) and a diamine component (b); and
a solvent (B);
wherein the diamine component (b) comprises at least one diamine compound (b-1) represented by Formula (I):

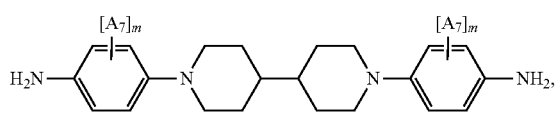

Formula (I)

wherein
$A_7$ independently represents a hydrogen atom, a $C_1$-$C_{10}$ alkyl group, a $C_1$-$C_{10}$ alkoxy group, an acetyl group, a fluorine atom, a chlorine atom, or a bromine atom; and
m represents an integer from 0 to 3.

The present invention also provides a liquid crystal alignment film made by the liquid crystal alignment agent as mentioned above.

The present invention also provides a method for forming a liquid crystal alignment film comprising coating the liquid crystal alignment agent as mentioned above on a substrate.

The present invention also provides a liquid crystal display element comprising the liquid crystal alignment film as mentioned above.

DETAILED DESCRIPTION OF THE INVENTION

Figure 1:
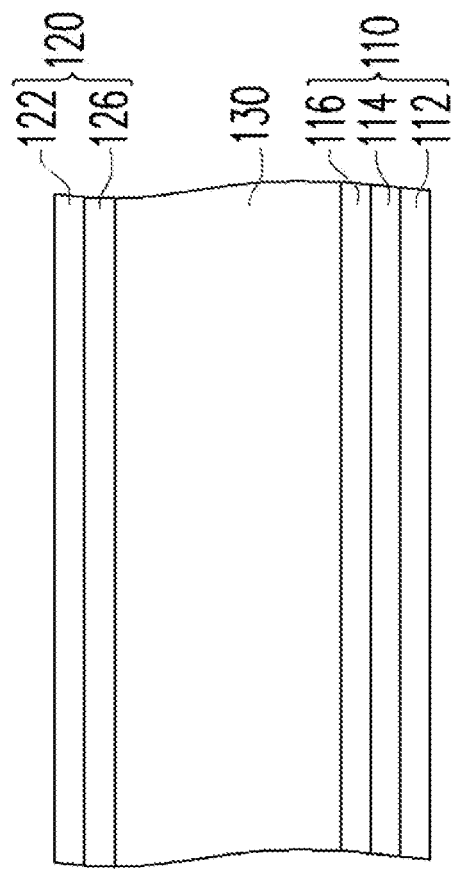
FIG. 1 shows a schematic diagram of a preferred embodiment of a liquid crystal display element according to the invention.

The present invention provides a liquid crystal alignment agent comprising:
a polymer (A) obtained by reacting a mixture comprising a tetracarboxylic acid dianhydride component (a) and a diamine component (b); and
a solvent (B);
wherein the diamine component (b) comprises at least one diamine compound (b-1) represented by Formula (I):

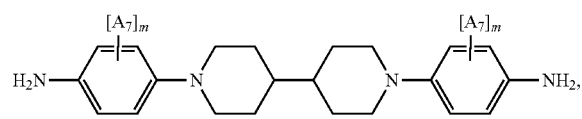

Formula (I)

wherein
$A_7$ independently represents a hydrogen atom, a $C_1$-$C_{10}$ alkyl group, a $C_1$-$C_{10}$ alkoxy group, an acetyl group, a fluorine atom, a chlorine atom, or a bromine atom; and
m represents an integer from 0 to 3.

The polymer (A) according to the invention is obtained by reacting a mixture comprising a tetracarboxylic acid dianhydride component (a) and a diamine component (b).

The preferred embodiment of the polymer (A) is a polyamic acid polymer, a polyimide polymer, a polyimide series block copolymer or combinations thereof. The preferred embodiment of the polyimide series block copolymer is a polyamic acid block copolymer, a polyimide block copolymer, a polyamic acid-polyimide block copolymer or combinations thereof.

The preferred embodiment of the tetracarboxylic acid dianhydride component (a) is (1) aliphatic tetracarboxylic acid dianhydride compounds, (2) alicyclic tetracarboxylic acid dianhydride compounds, (3) aromatic tetracarboxylic acid dianhydride compounds, or (4) tetracarboxylic acid dianhydride compounds having the structures of Formulae (a-1) to (a-6).

According to the invention, the (1) aliphatic tetracarboxylic acid dianhydride compounds include but are not limited to ethane tetracarboxylic dianhydride, or butane tetracarboxylic dianhydride.

According to the invention, the (2) alicyclic tetracarboxylic acid dianhydride compounds include but are not limited to 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dicholoro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyltetracarboxylic dianhydride, cis-3,7-dibutylcycloheptyl-1,5-diene-1,2,5,6-tetracarboxylic dianhydride, 2,3,5-tricarboxyliccycloheptylacetyl dianhydride, or dicyclo[2.2.2]-octyl-7-ene-2,3,5,6-tetracarboxylic dianhydride.

According to the invention, the (3) aromatic tetracarboxylic acid dianhydride compounds include but are not limited to 3,4-dicarboxylic-1,2,3,4-tetrahydronaphthalene-1-succinic dianhydride, pyromellitic dianhydride, 3,3',4,4'-dibenzophenonetetracarboxylic dianhydride, 3,3',4,4'-biphenyl-sulfone tetracarboxylic dianhydride, 1,4,5,8-naphthalenetetracarboxylic dianhydride, 2,3,6,7-naphthalenetetracarboxylic dianhydride, 3,3'-4,4'-diphenylethane tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxylicphenoxyl)phenylene sulfide dianhydride, 4,4'-bis(3,4-dicarboxylicphenoxyl)diphenyl sulfone dianhydride, 4,4'-bis(3,4-dicarboxylicphenoxyl)diphenyl-propane dianhydride, 3,3',4,4'-perfluoroisopropylene diterephthalic acid dianhydride, 3,3',4,4'-diphenyltetracarboxylic dianhydride, bis(terephthalic acid)phenyl phosphine oxidedianhydride, p-phenylene-bis(triphenylterephthalic acid)dianhydride, m-phenylene-bis(triphenylterephthalic acid)dianhydride, bis(triphenylterephthalic acid)-4,4'-diphenylether dianhydride, bis(triphenylterephthalic acid)-4,4'-diphenylmethane dianhydride, ethylene glycol-bis(anhydrotrimelitate), propylene glycol-bis(anhydrotrimelitate), 1,4-butylene glycol-bis(anhydrotrimelitate), 1,6-heptylene glycol-bis(anhydrotrimelitate), 1,8-octylene glycol-bis(anhydrotrimelitate), 2,2-bis(4-hydrocarbonphenyl)propane-bis(anhydrotrimelitate), 2,3,4,5-tetrahydrofurantetracarboxylic dianhydride, 1,3,3a,4,5,9b-hexahydro-5-(tetrahydro-2,5-dioxofuran-3-yl)naphtho[1,2-c]furan-1,3-dione, 1,3,3a,4,5,9b-hexahydro-5-methyl-5-(tetrahydro-2,5-dioxol-3-furanyl)-naphtho[1,2-c]-furan-1,3-dione, 1,3,3a,4,5,9b-hexahydro-5-ethyl-5-(tetrahydro-2,5-dioxol-3-furanyl)-naphtho[1,2-c]-furan-1,3-dione, 1,3,3a,4,5,9b-hexahydro-7-methyl-5-(tetrahydro-2,5-dioxol-3-furanyl)-naphtho[1,2-c]-furan-1,3-dione, 1,3,3a,4,5,9b-hexahydro-7-ethyl-5-(tetrahydro-2,5-dioxol-3-furanyl)-naphtho[1,2-c]-furan-1,3-dione, 1,3,3a,4,5,9b-hexahydro-8-methyl-5-(tetrahydro-2,5-dioxol-3-furanyl)-naphtho[1,2-c]-furan-1,3-dione, 1,3,3a,4,5,9b-hexahydro-8-ethyl-5-(tetrahydro-2,5-dioxol-3-furanyl)-naphtho[1,2-c]-furan-1,3-dione, 1,3,3a,4,5,9b-hexahydro-5,8-dimethyl-5-(tetrahydro-2,5-dioxol-3-furanyl)-naphtho[1,2-c]-furan-1,3-dione, or 5-(2,5-dioxoltetrahydrofuranyl)-3-methyl-3-cyclohexene-1,2-dicarboxylic acid dianhydride.

According to the invention, the (4) tetracarboxylic acid dianhydride compounds have the structures of Formulae (a-1) to (a-6) listed below:

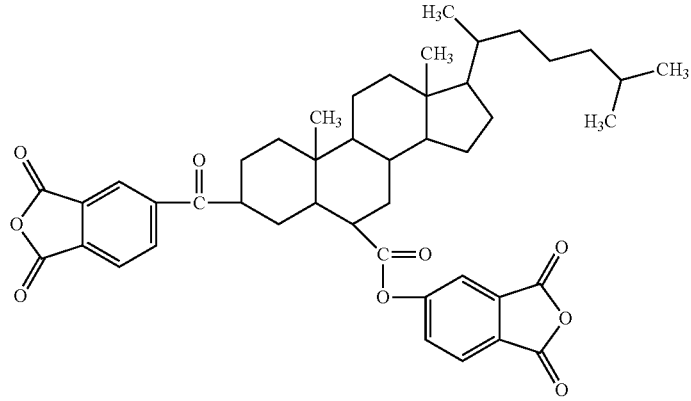

Formula (a-1)

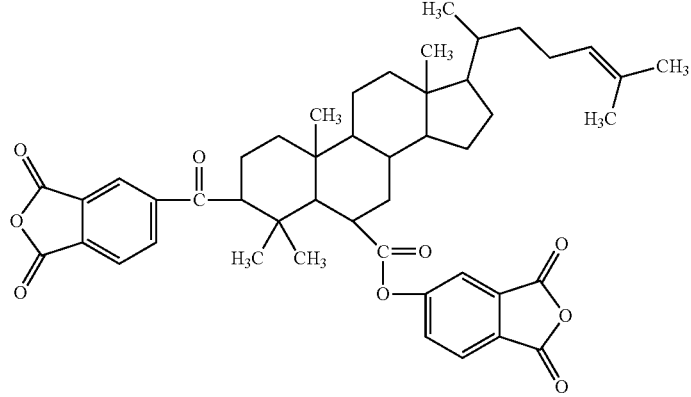

Formula (a-2)

Formula (a-3)

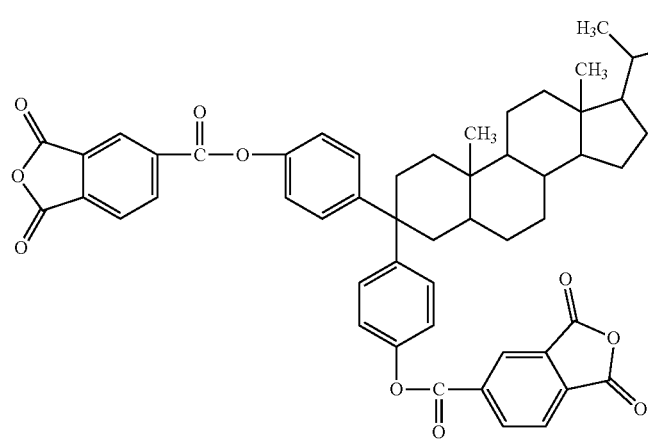

Formula (a-4)

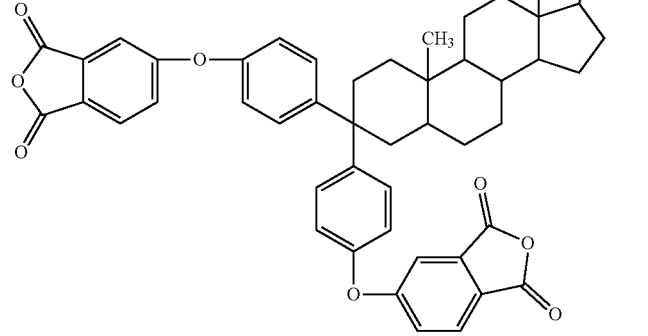

Formula (a-5)

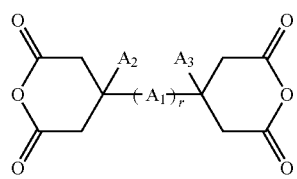

In Formula (a-5), $A_1$ represents a divalent group containing an aromatic ring; r represents an integer from 1 to 2; $A_2$ and $A_3$ are the same or different, and each represents a hydrogen atom or an alkyl group. Preferably, the tetracarboxylic acid dianhydride compounds have the structure of Formula (a-5) selected from Formulae (a-5-1) to (a-5-3) listed below:

Formula (a-5-1)

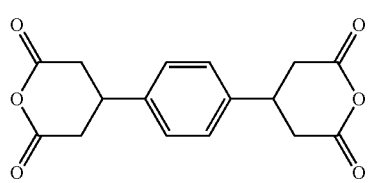

Formula (a-5-2)

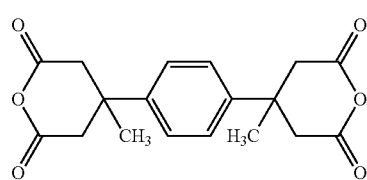

Formula (a-5-3)

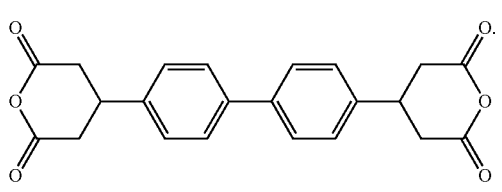

Formula (a-6)

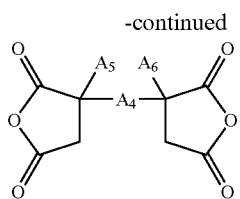

In Formula (a-6), $A_4$ represents a divalent group containing an aromatic ring; $A_5$ and $A_6$ are the same or different, and each represents a hydrogen atom or an alkyl group. Preferably, the tetracarboxylic acid dianhydride compounds have the structure of Formula (a-6) selected from Formula (a-6-1) listed below:

Formula (a-6-1)

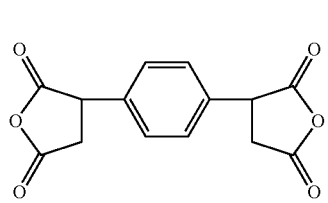

Preferably, the tetracarboxylic acid dianhydride component (a) comprises at least one tetracarboxylic acid dianhydride compound selected from the group consisting of aliphatic tetracarboxylic acid dianhydride compounds and alicyclic tetracarboxylic acid dianhydride compounds. When the tetracarboxylic acid dianhydride component (a) comprises at least one tetracarboxylic acid dianhydride compound selected from the group consisting of aliphatic tetracarboxylic acid dianhydride compounds and alicyclic tetracarboxylic acid dianhydride compounds, the liquid crystal alignment film has high rubbing resistance.

Preferably, the aliphatic tetracarboxylic acid dianhydride compounds include but are not limited to ethane tetracarboxylic dianhydride, or butane tetracarboxylic dianhydride.

Preferably, the alicyclic tetracarboxylic acid dianhydride compounds include but are not limited to 1,2,3,4-cyclobutane tetracarboxylic dianhydride, 1,2,3,4-cyclopentane tetracarboxylic dianhydride, 2,3,5-tricarboxyliccycloheptylacetyl dianhydride, or 1,2,4,5-cyclohexane tetracarboxylic dianhydride.

The above mentioned tetracarboxylic acid dianhydride compounds can be used alone or in combinations.

In one embodiment according to the present invention, based on 100 moles of the used amount of the tetracarboxylic acid dianhydride component (a), the total used amount of the aliphatic tetracarboxylic dianhydride compound and the alicyclic tetracarboxylic dianhydride compound is from 20 to 100 moles; preferably is 30 to 90 moles; more preferably is 40 to 80 moles.

The diamine component (b) according to the present invention comprises at least one diamine compound (b-1) represented by Formula (I):

Formula (I)

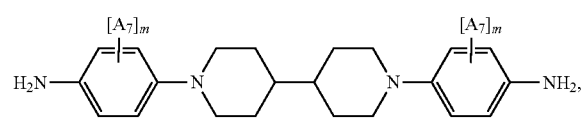

wherein, $A_7$ independently represents a hydrogen atom, a $C_1$-$C_{10}$ alkyl group, a $C_1$-$C_{10}$ alkoxy group, an acetyl group, a fluorine atom, a chlorine atom, or a bromine atom; and m represents an integer from 0 to 3.

The synthesis method of the diamine compound (b-1) represented by Formula (I) is known to artisans skilled in this field. For example, a nitro compound is obtained by reacting a nitrobenzene having a corresponding substituent group or a derivative thereof and a 4,4'-bipiperidine under heated reaction; under a reducing condition, a amine group is obtained by using a reducing agent, such as Tin or hydrochloric acid, to reduce the nitro group.

The embodiment of the diamine compound (b-1) represented by Formula (I) according to the present invention are compounds having the structures of Formulae (I-1) to (I-27):

Formula (I-1)

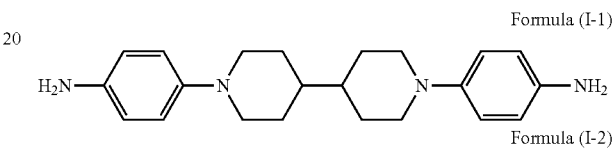

Formula (I-2)

Formula (I-3)

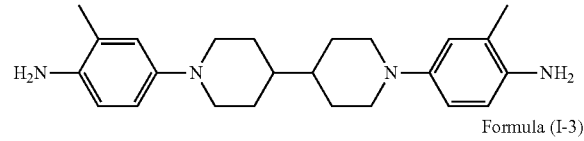

Formula (I-4)

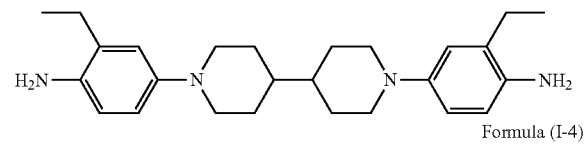

Formula (I-5)

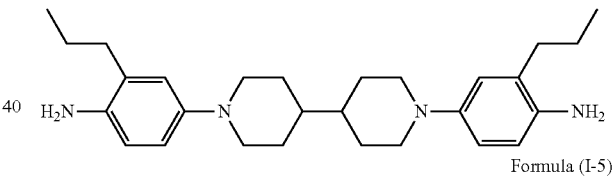

Formula (I-6)

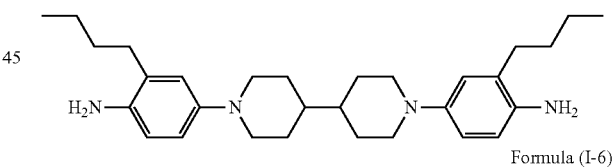

Formula (I-7)

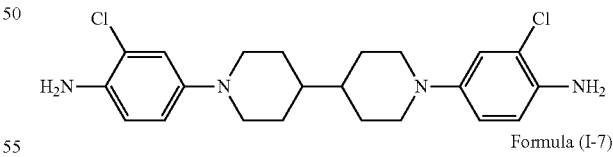

Formula (I-8)

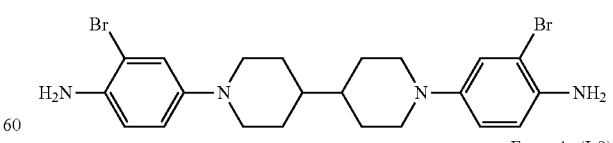

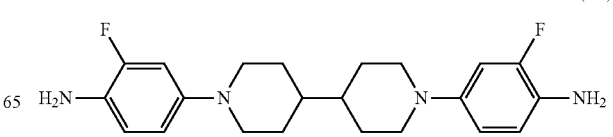

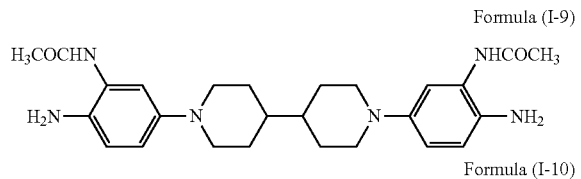

Formula (I-9)

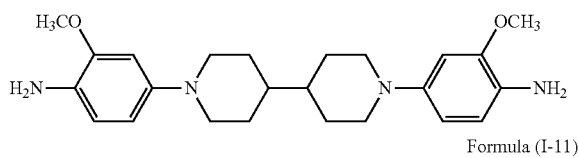

Formula (I-10)

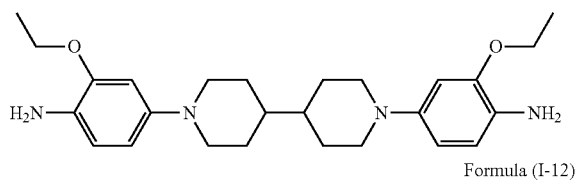

Formula (I-11)

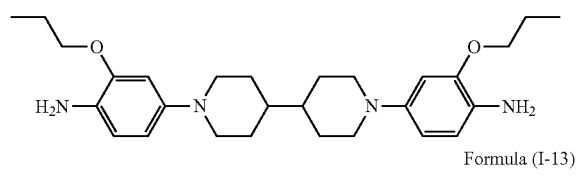

Formula (I-12)

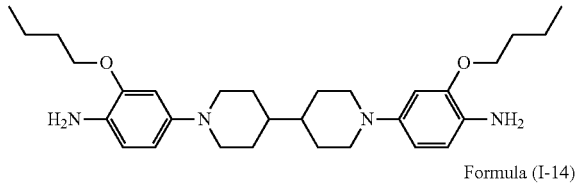

Formula (I-13)

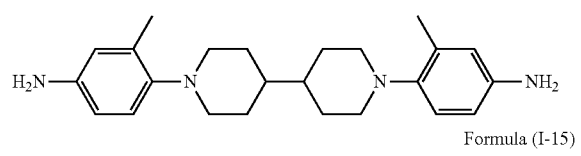

Formula (I-14)

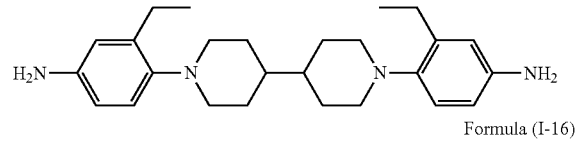

Formula (I-15)

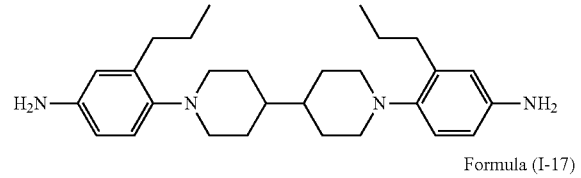

Formula (I-16)

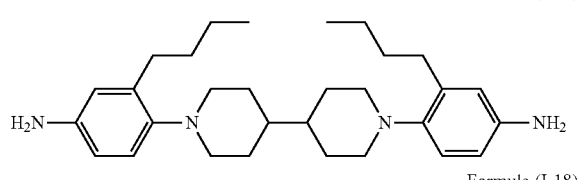

Formula (I-17)

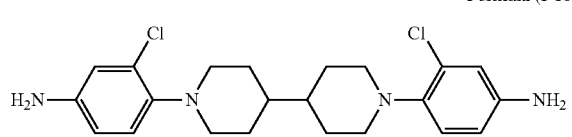

Formula (I-18)

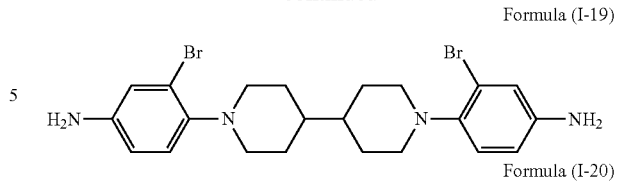

Formula (I-19)

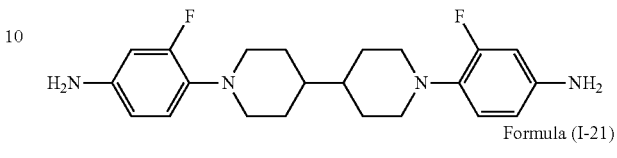

Formula (I-20)

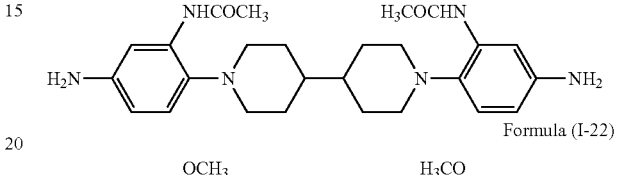

Formula (I-21)

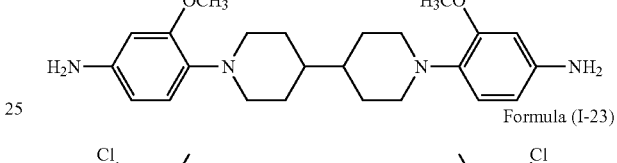

Formula (I-22)

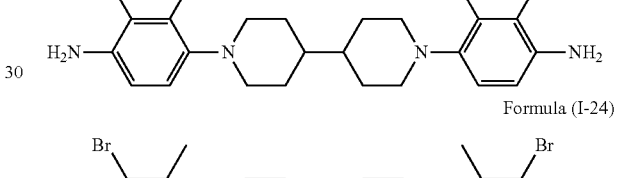

Formula (I-23)

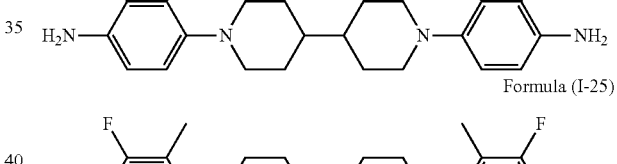

Formula (I-24)

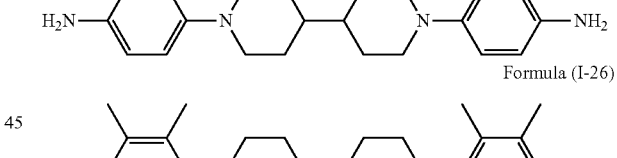

Formula (I-25)

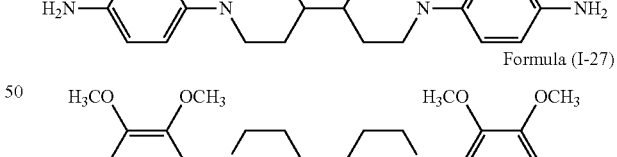

Formula (I-26)

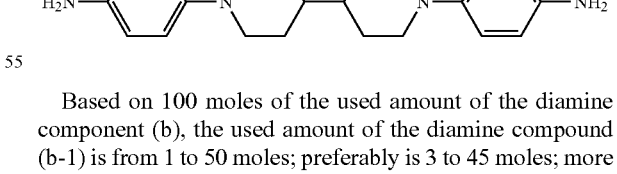

Formula (I-27)

Based on 100 moles of the used amount of the diamine component (b), the used amount of the diamine compound (b-1) is from 1 to 50 moles; preferably is 3 to 45 moles; more preferably is 5 to 40 moles. If the diamine compound (b-1) is absent, the liquid crystal alignment film has a defect of rubbing resistance.

The preferred embodiment according to the present invention, in the diamine compound (b-1), when $A_7$ independently represents a hydrogen atom, a $C_1$-$C_{10}$ alkyl group, a $C_1$-$C_{10}$ alkoxy group, or an acetyl group, the liquid crystal alignment film has high rubbing resistance.

The preferred embodiment according to the present invention, the diamine component (b) further comprises an other diamine compound (b-2).

The other diamine compound (b-2) includes but is not limited to 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-aminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-di(3-aminopropoxy)ethane, 4,4'-diaminodicyclohexylmethane, 4,4'-diamino-3,3'-dimethyldicyclohexylamine, 1,3-diaminocyclohexane, 1,4-diaminocyclohexane, isophorondiamine, tetrahydrodicyclopentadienediamine, tricyclo(6.2.1.02,7)-undecenedimethylene diamine, 4,4'-methylenedi(cyclohexylamine), 4,4'-diaminodiphenylmethane, 4,4'-diaminodiphenylethane, 4,4'-diaminodiphenylsulfone, 4,4'-diaminobenzoylaniline, 4,4'-diaminodiphenylether, 3,4'-diaminodiphenylether, 1,5-diaminonaphthalene, 5-amino-1-(4'-aminophenyl)-1,3,3-trimethylinden, 6-amino-1-(4'-aminophenyl)-1,3,3-trimethylinden, hexahydro-4,7-methanohydroindenedimethylenediamine, 3,3'-diaminodibenzophenone, 3,4'-diaminodibenzophenone, 4,4'-diaminodibenzophenone, 2,2-bis[4-(4-aminophenoxy)phenyl]propane, 2,2-bis[4-(4-aminophenoxy)phenyl]hexafluoropropane, 2,2-bis(4-aminophenyl) hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl) fluorene, 4,4'-methylene-bis(2-chloroaniline), 4,4'-(p-phenyleneisobutenyl)dianiline, 4,4'-(m-phenyleneisobutenyl)dianiline, 2,2'-bis[4-(4-amino-2-trifluoromethylphenoxy)phenyl]hexafluoropropane, 4,4'-bis[(4-amino-2-trifluoromethyl)phenoxy]-octafluorobiphenyl, 5-[4-(4-n-pentylcyclohexyl)cyclohexyl]phenylmethylene-1,3-diaminobenzene, 1,1-bis[4-(4-aminophenoxy) phenyl]-4-(4-ethylphenyl)cyclohexane or the other diamine compound (b-2) having the structures of Formulae (b-1) to (b-25) listed below:

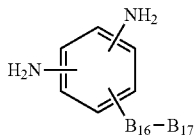

Formula (b-1)

in Formula (b-1),
$B_{16}$ represents

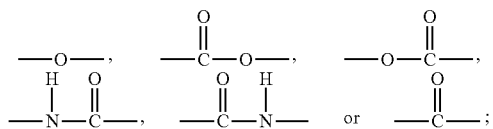

and $B_{17}$ represents a steroid group, a trifluoromethyl group, a fluoro group, a $C_2$-$C_{30}$ alkyl group or a monovalent group containing a nitrogen atom cyclic structure derived from pyridine, pyrimidine, triazine, piperidine, and piperazine.

Preferably, the other diamine compound (b-2) having the structures of Formula (b-1) is 2,4-diaminophenyl ethyl formate, 3,5-diaminophenyl ethyl formate, 2,4-diaminophenyl propyl formate, 2,4-diaminophenyl propyl formate, 1-dodecoxy-2,4-aminobenzene, 1-hexadecoxy-2,4-aminobenzene, 1-octadecoxy-2,4-aminobenzene or the other diamine compound (b-2) having the structures of Formulae (b-1-1) to (b-1-4) listed below:

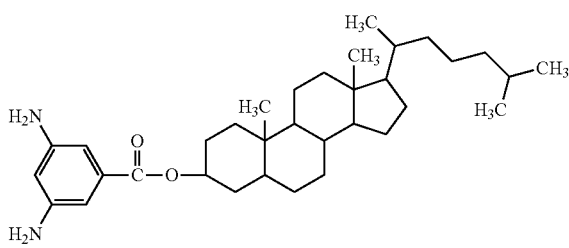

Formula (b-1-1)

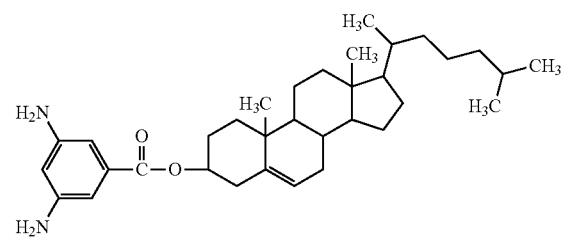

Formula (b-1-2)

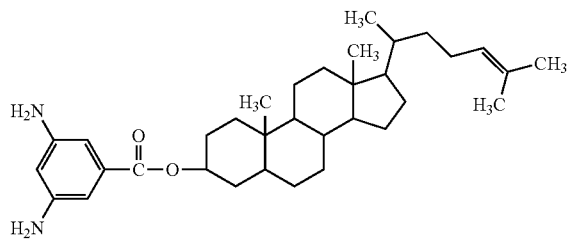

Formula (b-1-3)

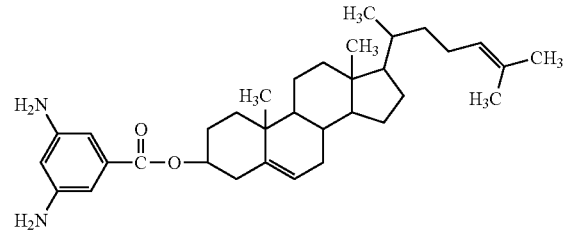

Formula (b-1-4)

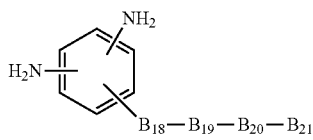

Formula (b-2)

In Formula (b-2), $B_{18}$ represents

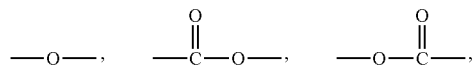

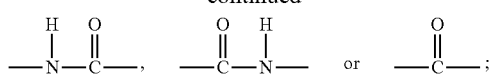

$B_{19}$ and $B_{20}$ represent a alicyclic group, an aromatic group, or a heterocyclic group; and $B_{21}$ represents a $C_3$-$C_{18}$ alkyl group, a $C_3$-$C_{18}$ alkoxy group, a $C_1$-$C_5$ fluoroalkyl group, a $C_1$-$C_5$ fluoroalkoxy group, a cyano group or a halogen atom.

Preferably, the other diamine compound (b-2) has the structures of Formulae (b-2-1) to (b-2-13) listed below:

Formula (b-2-1)

Formula (b-2-2)

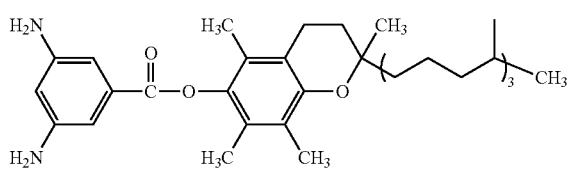

Formula (b-2-3)

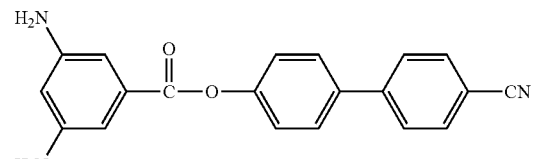

Formula (b-2-4)

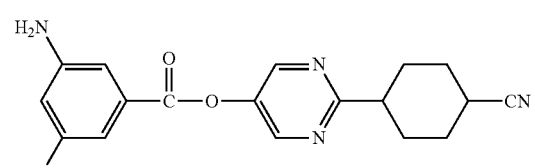

Formula (b-2-5)

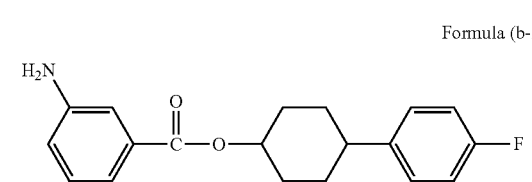

Formula (b-2-6)

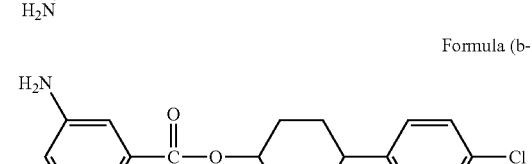

Formula (b-2-7)

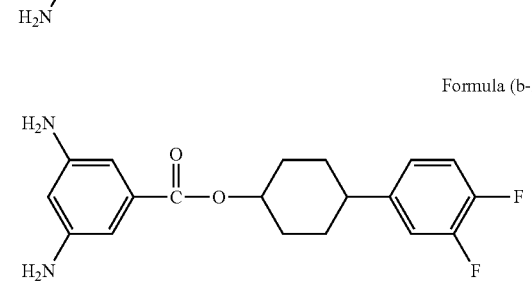

Formula (b-2-8)

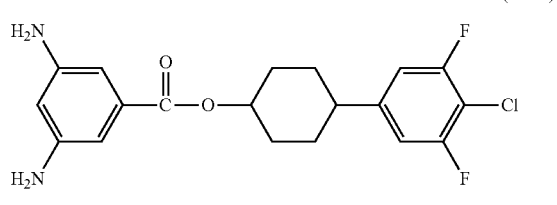

Formula (b-2-9)

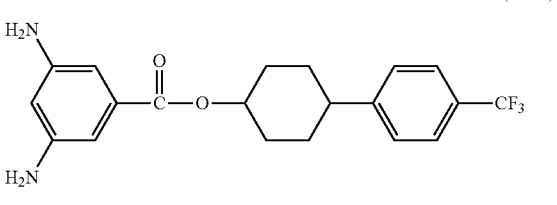

Formula (b-2-10)

Formula (b-2-11)

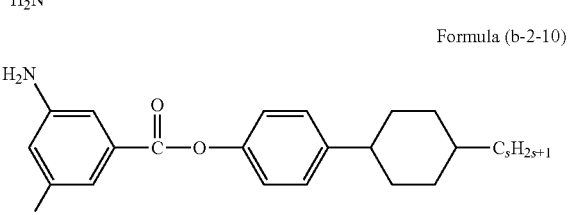

Formula (b-2-12)

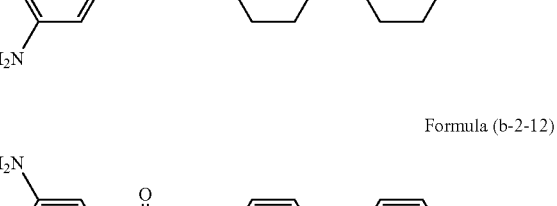

Formula (b-2-13)

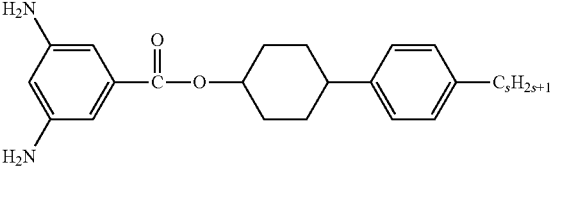

in Formulae (b-2-10) to (b-2-13), b represents an integer from 3 to 12.

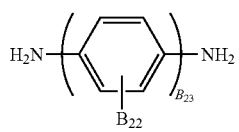
Formula (b-3)

In Formula (b-3), $B_{22}$ represents a hydrogen atom, a $C_1$-$C_5$ acyl group, a $C_1$-$C_5$ alkyl group, a $C_1$-$C_5$ alkoxy group, a halogen atom, and each repeated unit of $B_{22}$ is the same or different; and $B_{23}$ represents an integer from 1 to 3.

Preferably, the diamine compound having the structure of Formula (b-3) is (1) when $B_{23}$ is 1: p-diaminebenzene, m-diaminebenzene, o-diaminebenzene or 2,5-diaminotoluene; (2) when $B_{23}$ is 2: 4,4'-diaminobiphenyl, 2,2'-dimethyl-4,4'-diaminobiphenyl, 3,3'-dimethyl-4,4'-diaminobiphenyl, 3,3'-dimethoxyl-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxylbiphenyl, or 4,4'-diamino-2,2'-di(trifluoromethyl)biphenyl; (3) $B_{23}$ is 3: 1,4-di(4'-aminophenyl)benzene; more preferably, Formula (b-3) is selected from p-diaminobenzene, 2,5-diaminotoluene, 4,4'-diaminobiphenyl, 3,3'-dimethoxyl-4,4'-diaminobiphenyl, or 1,4-di(4'-aminophenyl)benzene.

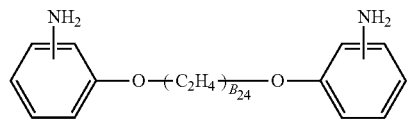
Formula (b-4)

In Formula (B-4), $B_{24}$ represents an integer from 2 to 12.

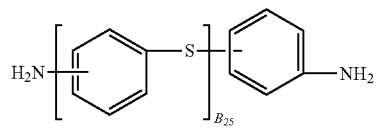
Formula (b-5)

In Formula (B-5), $B_{25}$ represents an integer from 1 to 5. Preferably, Formula (b-5) is 4,4'-diaminodiphenylsulfide.

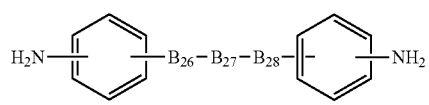
Formula (b-6)

In Formula (b-6), $B_{26}$ and $B_{28}$ are the same or different and independently represent a divalent organic group; $B_{27}$ is a divalent group containing a nitrogen atom cyclic structure derived from pyridine, pyrimidine, triazine, piperidine, and piperazine.

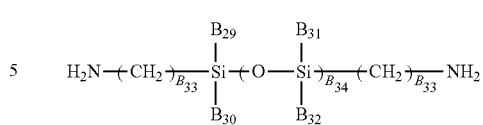
Formula (b-7)

In Formula (b-7), $B_{29}$, $B_{30}$, $B_{31}$ and $B_{32}$ are the same or different and represent a $C_1$-$C_{12}$ hydroxyl group. $B_{33}$ represents an integer from 1 to 3; and $B_{34}$ represents an integer from 1 to 20.

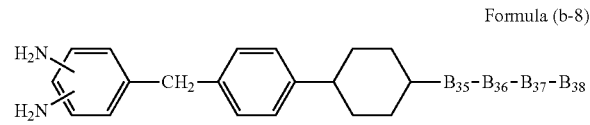
Formula (b-8)

In Formula (b-8), $B_{35}$ represents

or a cyclohexalene group; $B_{36}$ represents —$CH_2$—, $B_{37}$ represents a phenylene group or a cyclohexalene group; and $B_{38}$ represents a hydrogen atom or a heptyl group.

Preferably, the diamine compound has the structure of Formula (b-8) selected from Formulae (b-8-1) to (b-8-2) listed below:

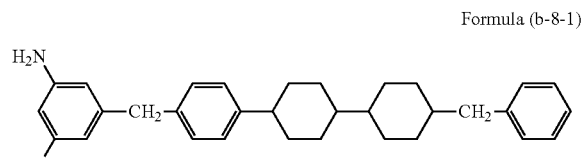
Formula (b-8-1)

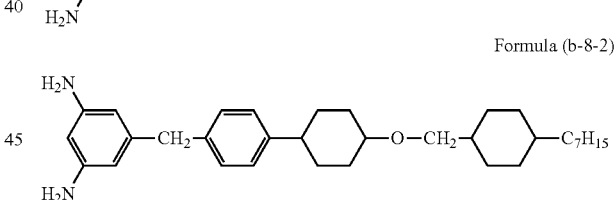
Formula (b-8-2)

The diamine compound (b-2) has the structure of Formula (b-9) to (b-25) listed below:

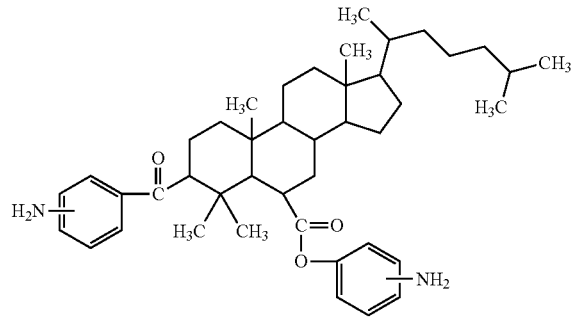
Formula (b-9)

-continued
Formula (b-10)
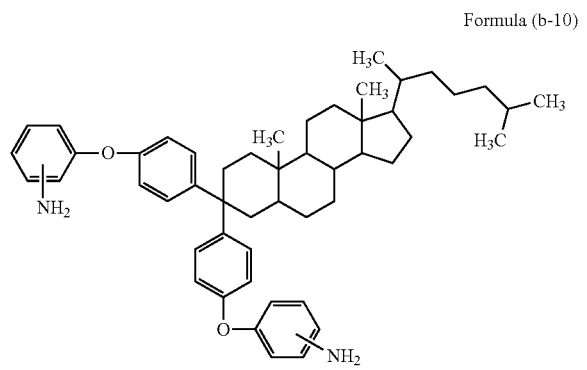
Formula (b-11)
Formula (b-12)
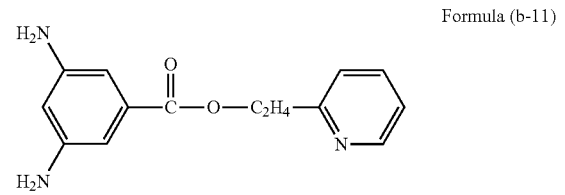
Formula (b-13)
Formula (b-14)
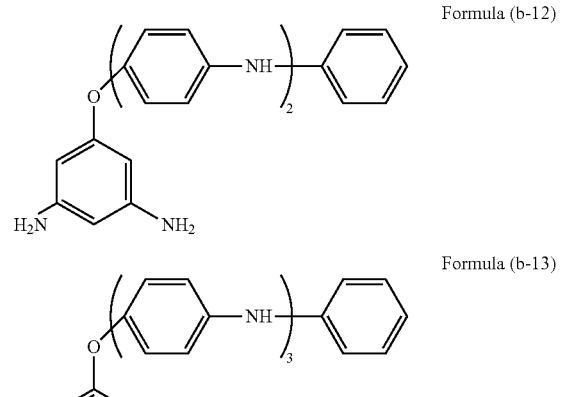
Formula (b-15)
Formula (b-16)
-continued
Formula (b-17)
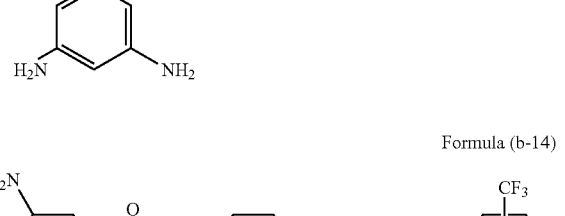
Formula (b-18)
Formula (b-19)
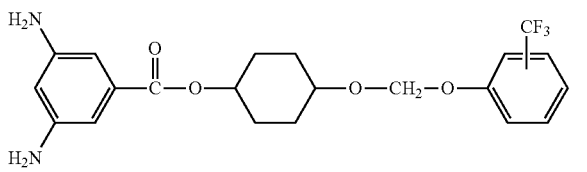
Formula (b-20)
Formula (b-21)
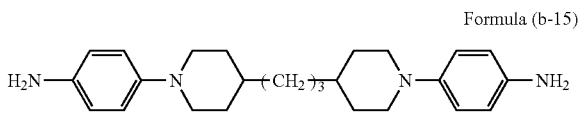
Formula (b-22)
Formula (b-23)
Formula (b-24)

-continued

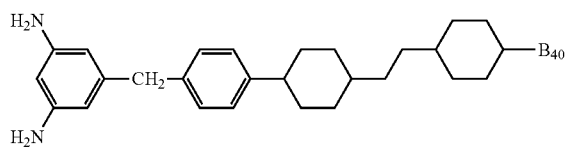

Formula (b-25)

In Formulae (b-17) to (b-25), preferably, $B_{39}$ represents a $C_1$-$C_{10}$ alkyl group or a $C_1$-$C_{10}$ alkoxy group; preferably, $B_{40}$ represents a hydrogen atom, a $C_1$-$C_{10}$ alkyl group or a $C_1$-$C_{10}$ alkoxy group.

Preferably, the other diamine compound (b-2) includes but is not limited to 1,2-diaminoethane, 4-4'-diaminodicyclohexylmethane, 4-4'-diaminodiphenylmethane, 4,4'-diaminodiphenylether, 5-[4-(4-n-pentylcyclohexyl)cyclohexyl]phenylmethylene-1,3-diaminebenzene, 1,1-bis[4-(4-aminophenoxyl)phenyl]-4-(4-ethylphenyl)cyclohexane, 2,4-diaminophenylethyl formate, Formula (b-1-1), Formula (b-1-2), Formula (b-2-1), Formula (b-2-11), p-diaminebenzene, m-diaminebenzene, o-diaminebenzene or the compound having the structure of Formula (b-8-1).

Based on 100 moles of the used amount of the diamine component (b), the used amount of the other diamine compound (b-2) is from 50 to 99 moles; preferably, the used amount of the other diamine compound (b-2) is from 55 to 97 moles; more preferably, the used amount of the other diamine compound (b-2) is from 60 to 95 moles.

According to the invention, the preparation of the polyamic acid polymer can be a common one. Preferably, the method for preparing the polyamic acid polymer comprising steps of: dissolving a mixture containing the tetracarboxylic acid dianhydride component (a) and the diamine component (b) in a solvent; conducting a polycondensation at 0° C. to 100° C. for 1 hour to 24 hours; and then distilling the reaction solution under reduced pressure with an evaporator to obtain the polyamic acid polymer; or adding the reaction solution to a large amount of a poor solvent to obtain a precipitate and drying the precipitate by distillation under reduced pressure to obtain the polyamic acid polymer.

Preferably, based on 100 moles of the used amount of the diamine component (b), the used amount of the tetracarboxylic acid dianhydride component (a) is from 20 to 200 moles; more preferably, the used amount of the tetracarboxylic acid dianhydride component (a) is from 30 to 120 moles.

The solvent used in the polycondensation and the solvent of the liquid crystal alignment agent can be the same or different. The solvent used in the polycondensation is not particularly limited as long as can dissolve the reactants and products. Preferably, the solvent comprises but is not limited to (1) aprotic polar solvent: N-methyl-2-pyrrolidone, N,N-dimethylacetylamine, N,N-dimethylformylamine, dimethylsulfoxide, γ-butyrolactone, tetramethyl urea, or hexamethylphosphoric triamide; (2) phenol solvent: m-cresol, xylenol, phenol, or halogenated phenols. The amount of the solvent used in the polycondensation is from 200 to 2000 parts by weight based on the 100 parts by weight of the mixture used; more preferably, the amount of the solvent used in the polycondensation is from 300 to 1800 parts by weight.

Particularly, in the polycondensation, the solvent can be combined with a proper amount of poor solvent without precipitating the polyamic acid polymer. The poor solvent can be used alone or in combinations, and includes but is not limited to (1) alcohols: methanol, ethanol, isopropanol, cyclohexanol, ethylene glycol, propylene glycol, 1,4-butylene glycol, or triethylene glycol; (2) ketones: acetone, methyl ethyl ketone, methyl isobutyl ketone, or cyclohexanone; (3) esters: methyl acetate, ethyl acetate, butyl acetate, diethyl oxalate, diethyl malonate, or ethylene glycol ethyl ether acetate; (4) ether: diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, or diethylene ethylene glycol dimethyl ether; (5) halogenated hydrocarbons: dichloromethane, 1,2-dichloroethane, 1,4-dichlorobutane, trichloroethane, chlorobenzene, or o-dichlorobenzene; (6) hydrocarbons: tetrahydrofuran, hexane, heptane, octane, benzene, toluene, or xylene; or (7) combinations thereof. Preferably, the amount of the poor solvent used is from 0 to 60 parts by weight based on 100 parts by weight of the diamine component (b) used; more preferably, the amount of the poor solvent used is from 0 to 50 parts by weight.

According to the invention, the preparation of the polyimide polymer can be a common one, preferably, the preparation of the polyimide polymer comprising dissolving a mixture containing the tetracarboxylic acid dianhydride component (a) and the diamine component (b) in a solvent and conducting a polymerization to form the polyamic acid polymer, and in the presence of a dehydrating agent and catalyst, heating the reactants and conducting a dehydrated ring-closing reaction to change the amide group in the polyamic acid polymer to the imide group in the dehydrated ring-closing reaction and to obtain the polyimide polymer.

The solvent used in the dehydrated ring-closing reaction and the solvent of the liquid crystal alignment agent can be the same and is not repeated herein. The amount of the solvent used in the dehydrated ring-closing reaction used is from 200 to 2000 parts by weight based on 100 parts by weight of the polyamic acid polymer used; more preferably, the amount of the solvent used in the dehydrated ring-closing reaction used is from 300 to 1800 parts.

In order to obtain the optimal degree of imide of the polyamic acid polymer, the reaction temperature of the dehydrated ring-closing reaction is preferably 40° C. to 200° C.; more preferably, the reaction temperature of the dehydrated ring-closing reaction is 40° C. to 150° C. If the reaction temperature of the dehydrated ring-closing reaction is lower than 40° C., the reaction is not completed resulting the degree of the imide of the polyamic acid polymer is poor. However, if the reaction temperature of the dehydrated ring-closing reaction is higher than 200° C., the weight average molecular weight of the polyimide polymer obtained is too low.

The dehydrating agent used in the dehydrated ring-closing reaction is preferably selected from (1) acid anhydride compounds: acetate anhydride, propionic acid anhydride, or trifluoroacetate anhydride. The amount of the dehydrating agent used is from 0.01 to 20 moles based on 1 mole of the polyamic acid polymer used. The catalyst used in the dehydrated ring-closing reaction is selected from (1) pyridines: pyridine, trimethyl pyridine, or dimethyl pyridine; (2) triamines: triethylamine. The amount of the catalyst used is from 0.5 to 10 moles based on 1 mol of the dehydrating agent used.

The preferred embodiment of the polyimide series block copolymer is a polyamic acid block copolymer, a polyimide block copolymer, a polyamic acid-polyimide block copolymer or combinations thereof.

According to the invention, the preparation of the polyimide series block copolymer can be a common one. Preferably, the preparation of the polyimide series block copolymer comprising: dissolving a starting agent in a solvent and conducting a polycondensation to obtain the product. The starting agent comprises at least one of the above mentioned polyamic acid polymer and/or at least one of the above mentioned polyimide polymer, and optionally comprises a tetracarboxylic acid dianhydride component (a) and a diamine component (b).

The diamine compound and the tetracarboxylic acid dianhydride compound in the starting agent are the same to the tetracarboxylic acid dianhydride component (a) and the diamine component (b) for preparing the polyamic acid polymer, and the solvent used in the polycondensation is the same to the solvent of the liquid crystal alignment agent and are not repeated herein.

Preferably, the amount of the solvent used in the polycondensation used is from 200 to 2000 parts by weight based on 100 parts by weight of the starting agent used; more preferably, the amount of the solvent used in the polycondensation used is from 300 to 1800 parts by weight. Preferably, the temperature of the polycondensation is 0° C. to 200° C.; more preferably, the temperature of the polycondensation is 0° C. to 100° C.

Preferably, the starting agent includes but is not limited to (1) two polyamic acid polymers with different terminals and structures; (2) two polyimide polymers with different terminals and structures; (3) polyamic acid polymers and polyimide polymers with different terminals and structures; (4) polyamic acid polymers, tetracarboxylic acid dianhydride compounds and diamine compounds, wherein the structures of at least one of the tetracarboxylic acid dianhydride compounds and diamine compounds differ to those of the tetracarboxylic acid dianhydride compound and diamine compound for forming the polyamic acid polymer; (5) polyimide polymers, tetracarboxylic acid dianhydride compounds and diamine compounds, wherein, the structures of at least one of the tetracarboxylic acid dianhydride compounds and diamine compounds differ to those of the tetracarboxylic acid dianhydride compound and diamine compound for forming the polyimide polymer; (6) polyamic acid polymers, polyimide polymers, tetracarboxylic acid dianhydride compounds and diamine compounds, wherein, the structures of the tetracarboxylic acid dianhydride compounds and diamine compounds differ to those of the tetracarboxylic acid dianhydride compound and diamine compound for forming the polyamic acid polymer and polyimide polymer; (7) two polyamic acid polymers, tetracarboxylic acid dianhydride compounds and diamine compounds with different structures; (8) two polyimide polymers, tetracarboxylic acid dianhydride compounds and diamine compounds with different structures; (9) two polyamic acid polymers and diamine compounds with an acid anhydride terminal and with different structures; (10) two polyamic acid polymers and tetracarboxylic dianhydrides with an amino terminal and with different structures; (11) two polyimide polymers and diamines with an acid anhydride terminal and with different structures; (12) two polyimide polymers and tetracarboxylic acid dianhydride compounds with an amino terminal and with different structures.

Without prejudice to the effect of the present invention, preferably, the polyamic acid polymer, the polyimide polymer and the polyimide series block copolymer can be a terminal-modified polymer with molecular weight adjustment. By using the terminal-modified polymer, the coating property of the liquid crystal alignment agent is improved. The preparation of the terminal-modified polymer can be adding a monovalent compound in the polycondensation of the polyamic acid polymer. The monovalent compound comprises but is not limited to (1) monovalent acid anhydrides: maleic anhydride, phthalic anhydride, itaconic anhydride, succinic anhydride, n-decyl, n-dodecyl succinic anhydride, succinic anhydride, n-tetradecyl, or n-hexadecyl succinic anhydride; (2) monovalent amines-aniline, cyclohexylamine, n-butylamine, n-pentyl amine, n-hexylamine, n-heptyl amine, n-octylamine, n-nonyl amine, n-decyl amine, n-undecane amine, n-dodecylamine, n-tridecylamine, n-tetradecyl amine, n-pentadecane amines, amine n-hexadecane, n-heptadecane amine, n-octadecylamine, or n-eicosylamine; (3) monovalent isocyanates: phenyl isocyanate, or naphthyl isocyanate ester.

According to the invention, the preferred embodiment of the solvent (B) is N-methyl-2-pyrrolidone, γ-butyrolactone, γ-butyrolactone lactam, 4-hydroxy-4-methyl-2-pentanone, ethylene glycol monomethyl ether, butyl lactate, butyl acetate ester, methoxy methyl propionate, ethyl ethoxy propionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monomethyl ethyl ether, diethylene glycol monomethyl ether acetate, diethylene glycol monoethyl ether acetate, N,N-dimethyl formamide, N,N-dimethyl-acetamide. The solvent can be used alone or in combinations.

The liquid crystal alignment agent according to the invention, wherein the amount of the solvent (B) used is from 500 to 3000 parts by weight based on 100 parts by weight of the polymer (A) used; more preferably, the amount of the solvent (B) used is from 800 to 2500 parts by weight; still more preferably, the amount of the solvent (B) used is from 1000 to 2000 parts by weight.

Without prejudice to the effect of the present invention, the liquid crystal alignment agent according to the invention preferably comprises a compound (C) having at least two epoxy groups in one molecule. The compound (C) having at least two epoxy groups can be used alone or in combinations.

The compound (C) having at least two epoxy groups includes but is not limited to ethylene glycol diglycidyl ether, polyethylene glycol diglycidyl ether, propylene glycol diglycidyl ether, tripropylene glycol diglycidyl ether, polyethylene glycol diglycidyl ether, neopentyl ethylene glycol diglycidyl ether, 1,6-hexanediol diglycidyl ether, glycerin diglycidyl ether, 2,2-dibromo neopentyl glycol diglycidyl ether, 1,3,5,6-tetraglycidyl-2,4-hexanediol, N,N,N',N'-tetraglycidyl-m-xylene diamine, 1,3-bis(N,N-diglycidylaminomethyl)cyclohexane, N,N,N',N'-tetraglycidyl-4,4'-diamino diphenyl methane, N,N-glycidyl-p-glycidoxy aniline, 3-(N-allyl-N-glycidyl)aminopropyl trimethoxy silane, or 3-(N,N-diglycidyl)aminopropyl trimethoxy silane.

The amount of the compound (C) having at least two epoxy groups used is under 40 parts by weight based on 100 parts by weight of the polymer (A) used; preferably, the amount of the compound (C) having at least two epoxy groups used is from 0.1 to 30 parts by weight.

If the liquid crystal alignment agent comprises the compound (C) having at least two epoxy groups, the liquid crystal alignment film has high rubbing resistance.

Without prejudice to the effect of the present invention, the liquid crystal alignment agent according to the invention preferably comprises an additive (D). The additive (D) is a silane compound having a functional group. The additive (D) is to improve adhesion of the liquid crystal alignment film to the substrate. The additive (D) can be used alone or in combinations.

The silane compound having a functional group includes but is not limited to 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyl dimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxy silane, N-phenyl-3-aminopropyltriethoxysilane, N-bis(ethyleneoxide)-3-amino propyltrimethoxysilane, or N-bis(ethyleneoxide)-3-aminopropyltriethoxy silane.

The preparation of the liquid crystal alignment agent is not particularly limited, and can be a common mixture method; such as mixing the tetracarboxylic acid dianhydride component (a) and the diamine component (b) to form the polymer (A), and then adding the solvent (B) to the polymer (A) at 0° C. to 200° C. and optionally adding the compound (C) having at least two epoxy groups and/or the additive (D) and mixing with a stirring means to dissolving the reactants. Preferably, at 20° C. to 60°, adding the solvent (B) to the polymer composition.

The present invention also provides a liquid crystal alignment film made by the liquid crystal alignment agent as mentioned above.

The present invention also provides a method for forming a liquid crystal alignment film comprising coating the liquid crystal alignment agent as mentioned above on a substrate.

Preferably, the method for forming the liquid crystal alignment film comprising: coating the liquid crystal alignment agent on a surface of a substrate to form a coating film by a roller coating method, a spinner coating method, a printing method, or an inkjet method; and conducting a pre-bake treatment, post-bake treatment and alignment treatment to obtain the coating film.

The pre-bake treatment is for volatilizing the organic solvent in the coating film. Preferably, the pre-bake treatment is conducted at 30° C. to 120° C.; more preferably at 40° C. to 110° C.; still more preferably at 50° C. to 100° C.

The alignment treatment is not limited, and can be conducted by rubbing in a certain direction for alignment with a roller wound with a cloth made by nylon, rayon, cotton and other fibers.

The post-bake treatment is for a further dehydrated ring-closing reaction (imidization) of the polymer in the coating film. Preferably, the post-back treatment is conducted at 150° C. to 300° C., more preferably at 180° C. to 280° C., still more preferably at 200° C. to 250° C.

The present invention also provides a liquid crystal display element comprising the liquid crystal alignment film as mentioned above.

The method for producing the liquid crystal display element is known to artisans skilled in this field and only briefed as below.

Referring to FIG. 1, in the preferred embodiment of the invention, the liquid crystal display element comprises a first unit 110, a second unit 120, and a liquid crystal unit 130, wherein the second unit 120 set opposite to the first unit 110 with an interval, and the liquid crystal unit 130 set between the first unit 110 and the second unit 120.

The first unit 110 comprises a first substrate 112, an electrode 114, and a first liquid crystal alignment film 116, wherein the electrode 114 formed on a surface of the first substrate 112 by pectinate patterned, and the first liquid crystal alignment film 116 formed on a surface of the electrode 114.

The second unit 120 comprises a second substrate 122, and a second liquid crystal alignment film 126, wherein the second liquid crystal alignment film 126 formed on a surface of the second substrate 122.

The first substrate 112 and the second substrate 122 are a transparent material. The transparent material includes but is not limited to alkali-free glass, soda-lime glass, hard glass (Pyrex glass), and quartz glass, polyethylene terephthalate, polybutylene terephthalate, polyether sulfone, or polycarbonate for liquid crystal display device. The material of the electrode 114 is selected from $SnO_2$, $In_2O_3$—$SnO_2$, or the like.

The first liquid crystal alignment film 116 and the second liquid crystal alignment film 126 are the above mentioned liquid crystal alignment film, respectively, and are for forming a pretilt angle of the liquid crystal unit 130. The liquid crystal unit 130 can be driven by the electric field formed by the electrode 114.

The liquid crystal used in the liquid crystal unit 130 can be used alone or in combinations. The liquid crystal includes but is not limited to diaminobenzene liquid crystal, pyridazine liquid crystal, shiff base liquid crystal, azoxy liquid crystal, biphenyl liquid crystal, phenyl cyclohexane liquid crystal, liquid crystal, terphenyl liquid crystal, biphenylcyclohexane liquid crystal, pyrimidine liquid crystal, dioxane liquid crystal, bicyclooctane liquid crystal, or cubane liquid crystal, and optionally adding steroid liquid crystal such as cholesteryl chloride, cholesteryl nonanoate, or cholesteryl carbonate), or chiral agent such as C-15, CB-15 (manufactured by Merck), or ferroelectric liquid crystal such as p-decyloxybenzylidene-p-amino-2-methylbutyl cinnamate.

The liquid crystal display element made by the liquid crystal alignment agent according to the invention is suitable for all kinds of liquid crystal, such as TN, STN, TFT, VA, or IPS type liquid crystal display element. Besides, depending on the liquid crystal, it can be used in ferroelectric or anti-ferroelectric liquid crystal display element. Preferably, the liquid crystal display element as mentioned above is IPS type liquid crystal display element.

The following examples are given for the purpose of illustration only and are not intended to limit the scope of the present invention.

Preparation of the Polymer (A)

Synthesis Example A-1-1

A 500 mL four-necked flask set with a nitrogen inlet, stirrer, condenser and thermometer, and nitrogen was purged. The feed composition comprising 5.08 g (0.01 mole) of a compound having the structure of Formula (I-7) (hereafter referred as b-1-1), 0.27 g (0.04 mole) of p-diaminobenzene and 80 g of N-methyl-2-pyrrolidone (hereafter referred as NMP) was stirred to dissolve. Then, 10.91 g (0.05 mol)

of pyromellitic dianhydride (hereafter referred as a-1) and 20 g of NMP were added for reacting at the room temperature for 2 hours. After completing the reaction, the reaction solution was poured into 1500 mL of water to precipitate the polymers. The polymers filtered were washed with methanol and filtered for three times and dried at 60° C. with a vacuum oven to obtain the polyamic acid polymer (A-1-1).

Synthesis Examples A-1-2 to A-1-10

The Synthesis Examples A-1-2 to A-1-10 with the modifications of various kinds and amounts of the compositions for the polymer. The formulations and evaluation results thereof are listed in Table 1 and are not repeated herein.

Synthesis Example A-2-1

A 500 mL four-necked flask set with a nitrogen inlet, stirrer, condenser and thermometer, and nitrogen was purged. The feed composition comprising 5.08 g (0.01 mole) of a compound having the structure of Formula (I-7) (hereafter referred as b-1-1), 0.27 g (0.04 mole) of p-diaminobenzene and 80 g of N-methyl-2-pyrrolidone (hereafter referred as NMP) was stirred to dissolve. Then, 10.91 g (0.05 mol) of pyromellitic dianhydride (hereafter referred as a-1) and 20 g of NMP were added for reacting at the room temperature for 6 hours, then 97 g NMP, 2.55 g acetic oxide and 19.75 g pyridine were added, the temperature was raised to 60° C. and the composition was stirred for 2 hours. After completing the reaction, the reaction solution was poured into 1500 mL of water to precipitate the polymers. The polymers filtered were washed with methanol and filtered for three times and dried at 60° C. with a vacuum oven to obtain the polyamic acid polymer (A-2-1).

Synthesis Examples A-2-2 to A-2-3 and Comparative Synthesis Example A-3-1 to A-3-4

The Synthesis Examples A-2-2 to A-2-3 and Comparative Synthesis Example A-3-1 to A-3-4 are similar to Synthesis Example A-2-1 with the modifications of various kinds and amounts of the compositions for the polymer composition. The formulations and evaluation results thereof are listed in Table 1 and Table 2 and are not repeated herein.

TABLE 2

| Component (mole %) | | Comparative Synthesis Example | | | |
|---|---|---|---|---|---|
| | | A-3-1 | A-3-2 | A-3-3 | A-3-4 |
| tetracarboxylic acid dianhydride component (a) | a-1 | 100 | | | 50 |
| | a-2 | | 100 | | |
| | a-3 | | | 100 | |
| | a-4 | | | | |
| | a-5 | | | | 50 |
| | a-6 | | | | |
| diamine component (b) | diamine compound (b-1) | b-1-1 | | | |
| | | b-1-2 | | | |
| | | b-1-3 | | | |
| | | b-1-4 | | | |
| | | b-1-5 | | | |
| | | b-1-6 | | | |
| | | b-1-7 | | | |
| | other diamine compound (b-2) | b-2-1 | 80 | | 50 | |
| | | b-2-2 | 20 | 60 | | 54 |
| | | b-2-3 | | | 50 | |
| | | b-2-4 | | | | 54 |
| | | b-2-5 | | 40 | | |

In Table 1 and Table 2:
a-1 pyromellitic dianhydride
a-2 3,4-dicarboxylic-1,2,3,4-tetrahydronaphthalene-1-succinic dianhydride
a-3 butane tetracarboxylic dianhydride
a-4 ethane tetracarboxylic dianhydride
a-5 1,2,3,4-cyclobutane tetracarboxylic dianhydride
a-6 1,2,4,5-cyclohexane tetracarboxylic dianhydride

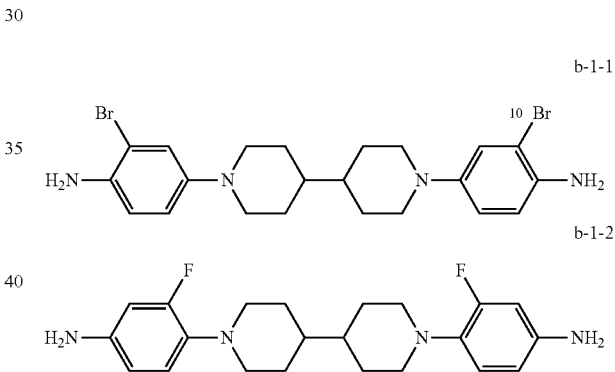

TABLE 1

| Component (mole %) | | | Synthesis Examples | | | | | | | | | | | | |
|---|---|---|---|---|---|---|---|---|---|---|---|---|---|---|---|
| | | | A-1-1 | A-1-2 | A-1-3 | A-1-4 | A-1-5 | A-1-6 | A-1-7 | A-1-8 | A-1-9 | A-1-10 | A-2-1 | A-2-2 | A-2-3 |
| tetracarboxylic acid dianhydride component (a) | | a-1 | 100 | | | | | 100 | 70 | 60 | | 80 | 100 | | 50 |
| | | a-2 | | 100 | | | 50 | | 30 | | 100 | | | 60 | 50 |
| | | a-3 | | | 100 | | | | | | | 20 | | 10 | |
| | | a-4 | | | | 50 | | | | | | | | | |
| | | a-5 | | | | 50 | | | | 40 | | | | | |
| | | a-6 | | | | | 50 | | | | | | | 30 | |
| diamine component (b) | diamine compound (b-1) | b-1-1 | 20 | | | | | | | | | | 20 | | |
| | | b-1-2 | | 40 | | | 10 | | | | 40 | | | 10 | |
| | | b-1-3 | | | 50 | | | | | | | 15 | | | |
| | | b-1-4 | | | | 30 | | | 10 | | | | | | |
| | | b-1-5 | | | | | 1 | | | | | | 25 | | |
| | | b-1-6 | | | | | | 5 | | | | | | | |
| | | b-1-7 | | | | | | 5 | | | | | | | 3 |
| | other diamine compound (b-2) | b-2-1 | 80 | | | | 50 | 90 | | | | | 80 | 65 | |
| | | b-2-2 | | 60 | | 70 | 40 | 9 | | 85 | 60 | | | | 95 |
| | | b-2-3 | | | 50 | | | | 90 | | | 70 | | | |
| | | b-2-4 | | | | | | | 5 | | | 15 | | | |
| | | b-2-5 | | | | | | | | | | | | | 2 |

-continued

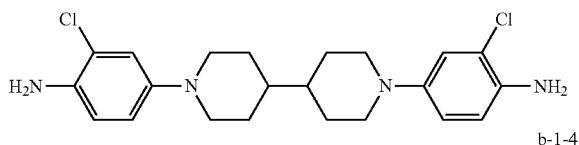

b-1-3

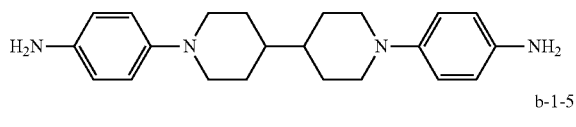

b-1-4

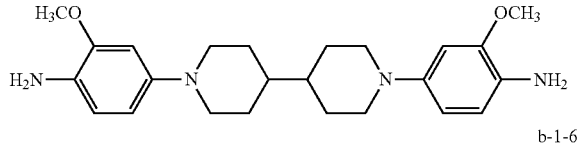

b-1-5

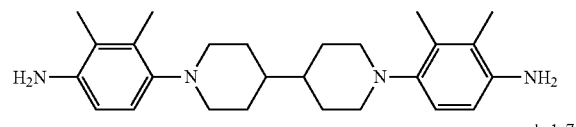

b-1-6

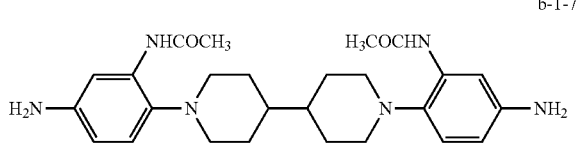

b-1-7 b-2-1 p-diaminebenzene
b-2-2 4-4'-diaminodiphenylmethane
b-2-3 4,4'-diaminodiphenylether
b-2-4 1,4-bis(4-aminophenyl)-1,4-piperazine
b-2-5 Formula (b-15)

Preparation of Liquid Crystal Alignment Agent, Liquid Crystal Alignment Film and Liquid Crystal Display Element One-hundred parts by weight of the polymer (A-1-1), 800 parts by weight of NMP and 800 parts by weight of ethylene glycol n-butyl ether (B-2) were mixed at the room temperature to form a liquid crystal alignment agent.

Examples 2 to 14 and Comparative Examples 1 to 4

Examples 2 to 14 and Comparative Examples 1 to 4 are similar to Example 1 for the preparation of the liquid crystal alignment agent, liquid crystal alignment film and liquid crystal display element with the modifications of the kind and amount of the polymer composition, solvent, and additive shown in Table 3. The liquid crystal alignment agent and liquid crystal display element are evaluated as below and the results are shown in Table 3 and Table 4.

TABLE 3

| Component (parts by weight) | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| polymer (A) | A-1-1 | 100 | | | | | | | | | | | | | 50 |
| | A-1-2 | | 100 | | | | | | | | | | | | |
| | A-1-3 | | | 100 | | | | | | | | | | | |
| | A-1-4 | | | | 100 | | | | | | | | | | |
| | A-1-5 | | | | | 100 | | | | | | | | | |
| | A-1-6 | | | | | | 100 | | | | | | | | |
| | A-1-7 | | | | | | | 100 | | | | | | | |
| | A-1-8 | | | | | | | | 100 | | | | | | |
| | A-1-9 | | | | | | | | | 100 | | | | | |
| | A-1-10 | | | | | | | | | | 100 | | | | |
| | A-2-1 | | | | | | | | | | | 100 | | | 50 |
| | A-2-2 | | | | | | | | | | | | 100 | | |
| | A-2-3 | | | | | | | | | | | | | 100 | |
| | A-3-1 | | | | | | | | | | | | | | |
| | A-3-2 | | | | | | | | | | | | | | |
| | A-3-3 | | | | | | | | | | | | | | |
| | A-3-4 | | | | | | | | | | | | | | |
| solvent (B) | B-1 | 800 | | | 1000 | | | 1200 | 1200 | | | 800 | | | 1200 |
| | B-2 | 800 | 1000 | 1600 | | 1000 | 1500 | 400 | 400 | 900 | 800 | | | | |
| | B-3 | | 600 | | 800 | 1000 | 100 | | 500 | | 500 | | 800 | 1200 | 300 |
| | B-4 | | | | | | | 600 | 500 | | | 1000 | | | 400 |
| compound (C) having at least two epoxy groups | C-1 | | | | 5 | | | | | | | | | | |
| | C-2 | | | | | | | 2 | | | | | | | |
| | C-3 | | | | | | | | | 1 | | | | | 10 |
| Evaluation | Rubbing resistance | ○ | ○ | ◎ | ◎ | ◎ | ◎ | ◎ | ◎ | ○ | ◎ | ○ | ◎ | ◎ | ◎ |

TABLE 4

| Component (parts by weight) | | Comparative Example | | | |
|---|---|---|---|---|---|
| | | 1 | 2 | 3 | 4 |
| polymer (A) | A-1-1 | | | | |
| | A-1-2 | | | | |
| | A-1-3 | | | | |
| | A-1-4 | | | | |
| | A-1-5 | | | | |
| | A-1-6 | | | | |
| | A-2-1 | | | | |
| | A-2-2 | | | | |
| | A-2-3 | | | | |
| | A-2-4 | | | | |
| | A-2-5 | | | | |
| | A-2-6 | | | | |
| | A-3-1 | 100 | | | |
| | A-3-2 | | 100 | | |
| | A-3-3 | | | 100 | |
| | A-3-4 | | | | 100 |
| solvent (B) | B-1 | 800 | | 1000 | 900 |
| | B-2 | 800 | 1000 | | 415 |
| | B-3 | | 600 | 800 | |
| | B-4 | | | | 250 |
| compound (C) having at least two epoxy groups | C-1 | | | | |
| | C-2 | | | | |
| | C-3 | | | | |
| Evaluation | Rubbing resistance | X | X | X | X |

In Table 3 and Table 4:
B-1 N-methyl-2-pyrrolidone
B-2 ethylene glycol n-butyl ether
B-3 N,N-dimethyl-acetamide
B-4 γ-butyrolactone
C-1 N,N,N',N'-tetraglycidyl-4,4'-diamino diphenyl methane
C-2 N,N-glycidyl-p-glycidoxy aniline
C-3 propylene glycol diglycidyl ether Evaluation Items Rubbing Resistance:

The liquid crystal alignment agents in Examples and Comparative Examples were spin coated independently on a glass substrate with ITO electrode, and then pre-baked for 2 minutes at 80° C. Then, the pre-baked coating film was placed under a circulation oven for 15 minutes at 230° C. to obtain a liquid crystal alignment film. Then, the liquid crystal alignment film was carried on under rubbing treatment with different pushing amount by cloth, and the conditions are as follows:
  roller diameter: 120 mm
  revolutions per minute: 1000 rpm
  movement speed: 20 mm/s
  pushing amount: 0.4 mm or 0.5 mm After rubbing treatment, a surface of the liquid crystal alignment film was observed and evaluated by using an microscope magnified 5 diameters:
  ⊚: no debris under 0.4 mm and 0.5 mm pushing amount
  ○: no debris under 0.4 mm pushing amount, but a few debris under 0.5 mm pushing amount
  Δ: a few debris under 0.4 mm and 0.5 mm pushing amount
  X: numerous debris under 0.4 mm and 0.5 mm pushing amount While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A liquid crystal alignment agent comprising:
   a polymer (A) obtained by reacting a mixture comprising a tetracarboxylic acid dianhydride component (a) and a diamine component (b); and
   a solvent (B);
   wherein the diamine component (b) comprises at least one diamine compound (b-1) represented by Formula (I):

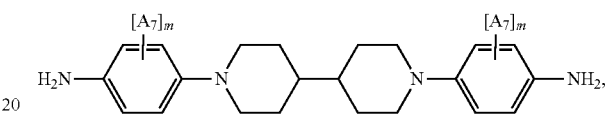

Formula (I)

wherein $A_7$ independently represents a $C_1$-$C_{10}$ alkyl group, a $C_1$-$C_{10}$ alkoxy group, an acetyl group, a fluorine atom, a chlorine atom, or a bromine atom; and m represents an integer from 0 to 3.

2. The liquid crystal alignment agent according to claim 1, wherein in the diamine compound (b-1) represented by Formula (I), $A_7$ independently represents a $C_1$-$C_{10}$ alkyl group, a $C_1$-$C_{10}$ alkoxy group, or an acetyl group.

3. The liquid crystal alignment agent according to claim 1, wherein based on 100 moles of the used amount of the diamine component (b), the used amount of the diamine compound (b-1) represented by Formula (I) is from 1 to 50 moles.

4. The liquid crystal alignment agent according to claim 1, wherein the tetracarboxylic acid dianhydride component (a) comprises at least one tetracarboxylic acid dianhydride compound selected from a group consisting of an aliphatic tetracarboxylic dianhydride compound and an alicyclic tetracarboxylic dianhydride compound.

5. The liquid crystal alignment agent according to claim 4, wherein based on 100 moles of the used amount of the tetracarboxylic acid dianhydride component (a), the total used amount of the aliphatic tetracarboxylic dianhydride compound and the alicyclic tetracarboxylic dianhydride compound is from 20 to 100 moles.

6. The liquid crystal alignment agent according to claim 1, wherein based on 100 parts by weight of the used amount of the polymer (A), the used amount of the solvent (B) is from 1000 to 2000 parts by weight.

7. The liquid crystal alignment agent according to claim 1, wherein the liquid crystal alignment agent further comprises a compound (C) having at least two epoxy groups in one molecule.

8. A liquid crystal alignment film made by the liquid crystal alignment agent according to claim 1.

9. A method for forming a liquid crystal alignment film comprising coating the liquid crystal alignment agent according to claim 1 on a substrate.

10. A liquid crystal display element comprising the liquid crystal alignment film according to claim 8.

* * * * *